(12) United States Patent
Klotsche

(10) Patent No.: US 7,515,539 B2
(45) Date of Patent: Apr. 7, 2009

(54) ROUTER WHICH FACILITATES SIMPLIFIED LOAD BALANCING

(75) Inventor: Ralf Klotsche, Neuenbürg (DE)

(73) Assignee: Alcatel, Paris (FR)

( * ) Notice: Subject to any disclaimer, the term of this patent is extended or adjusted under 35 U.S.C. 154(b) by 953 days.

(21) Appl. No.: 10/228,300

(22) Filed: Aug. 27, 2002

(65) Prior Publication Data

US 2003/0043831 A1  Mar. 6, 2003

(30) Foreign Application Priority Data

Aug. 29, 2001  (EP)  ............................. 01440286

(51) Int. Cl.
*G01R 31/08* (2006.01)
(52) U.S. Cl. .................. 370/235; 370/412; 370/474
(58) Field of Classification Search ........... 370/412, 370/468, 400, 414, 418, 230, 474
See application file for complete search history.

(56) References Cited

U.S. PATENT DOCUMENTS

| | | | |
|---|---|---|---|
| 5,231,633 A | 7/1993 | Hluchyj et al. | |
| 5,761,440 A | 6/1998 | De Marco | |
| 6,141,323 A | 10/2000 | Rusu et al. | |
| 6,226,267 B1 | 5/2001 | Narayanaswamy | |
| 6,721,796 B1 * | 4/2004 | Wong | 709/232 |
| 2002/0027909 A1 * | 3/2002 | Brinkerhoff et al. | 370/389 |
| 2002/0105908 A1 * | 8/2002 | Blumer et al. | 370/230 |
| 2002/0191642 A1 * | 12/2002 | Calvignac et al. | 370/474 |
| 2006/0062233 A1 * | 3/2006 | Brewer et al. | 370/412 |

FOREIGN PATENT DOCUMENTS

| | | |
|---|---|---|
| EP | 0 774 848 A2 | 5/1997 |
| EP | 0 843 499 A2 | 5/1998 |
| EP | 1 079 660 A1 | 2/2001 |
| WO | WO 00/30307 A1 | 5/2000 |
| WO | WO 00/52882 | 9/2000 |
| WO | WO 01/03400 A2 | 1/2001 |
| WO | WO 01/31882 A1 | 5/2001 |

OTHER PUBLICATIONS

Hou Y T et al: "A differentiated services architecture for multimedia streaming in next generation Internet" Computer Networks, Elsevier Science Publishers B.V., Amsterdam, NL., pp. 185-209, Feb. 2000.

* cited by examiner

*Primary Examiner*—Seema S Rao
*Assistant Examiner*—Wanda Z Russell
(74) *Attorney, Agent, or Firm*—Sughrue Mion, PLLC

(57) ABSTRACT

A router which facilitates a simplified load balancing is provided. The router contains at least one buffer memory for the intermediate storage of pointers for information packets in at least two different buffer memory areas, a readout unit for reading out the different buffer memory areas one after the other in predetermined time windows, and at least one RED processing unit. A feedback loop is provided from the readout unit to at least one RED processing unit in order to control the activation and de-activation of the RED processing unit. Indirect information about the occupancy levels of the buffer memory areas is passed via the feedback loop to the at least one RED processing unit. The readout unit operates with the weighted round robin mechanism and transmits information about buffer memory locations processed in the time slots to the at least one RED processing unit.

5 Claims, 3 Drawing Sheets

ROUTER WHICH FACILITATES SIMPLIFIED LOAD BALANCING

TECHNICAL FIELD

The invention concerns a router. The invention is based on a priority application EP 01 440 286.1 which is hereby incorporated by reference.

BACKGROUND OF THE INVENTION

Routers are used in telecommunication networks as an interface, for example, between a backbone network based on an Internet protocol and an access network, for example a DSL network; DSL=Digital Subscriber Line. DSL networks are constructed as ADSL, SDSL, VHDSL, for example, where A stands for Asymmetric, S for Symmetric and VH for Very High.

A router usually contains a packet memory and a readout unit and is used to route and receive information packets. The received information packets are temporarily stored in the packet memory. Routers which do not distinguish between service qualities operate on the FIFO (first in first out) principle, that is to say each packet is forwarded immediately on receipt. Routers which distinguish between different service qualities and have to handle each individual data flow separately, evaluate parts of each packet and compares it with a list of classifications which enable the assignment of the packet to a data flow. After the assignment, only pointers to the information packets are temporarily stored in a buffer memory. The classifier is provided in order to extract the pointers of the information packets from the received data flow, to evaluate them and to feed them to at least one buffer memory. The readout unit is used to read out the temporarily stored pointers and, by means of the read-out pointers, to detect and read out the information packets assigned to the read-out pointers. A so-called weighted round robin (WRR) mechanism is used for the readout procedure. In this case, different buffer memory areas are read out one after the other and in predetermined time windows. This process ensures that, at the outputs of the router, each data flow and each service class receives the bandwidth provided for it. The sequence of the packets between the various data flows can certainly change, but the packet sequence does not change within a data flow.

Information packets are usually transmitted in different, so-called Quality of Service (QoS) classes. A quality of service class specifies the so-called Voice over Internet Protocol (VoIP), for example. Another quality of service class specifies the so-called Best Effort (BE) service, for example. Voice, data, video, Internet web pages, etc., can be transmitted as information in information packets.

The routers which support a service-specific charging system, have to classify and route each information packet individually while taking different requirements into account.

The overall bandwidth of a transmission channel is distributed among the types of services on offer, and is comparable to the division of a circle into sectors. "Weighted" signifies that the sectors can be of unequal size to meet the specified traffic profile. The trick for QoS is that the sectors for VoIP are always slightly larger than the requirement, and that they follow one another sufficiently quickly. For best effort traffic, there is no quality guarantee and the provided bandwidth can be less than that requested. The sectors in the WRR may be too small in comparison with the emerging traffic. Best effort packets can therefore collide, be delayed or disappear altogether.

The search for pointers requires time, thereby impairing the processing speed of the router. In addition, a longer search can lead to gaps occurring in the output information packet stream, in which no information packets are transmitted, which leads to a lower information rate. Furthermore, a predetermined time slot is reserved for the readout of a stacking area, so that the processing of the stacking area is impaired by a longer search, which can cause an overflow of the stacking area, leading to information loss.

In addition, a process is implemented, which removes under random control the individual information packets that were temporarily stored but not yet read out, if the data transfer rate of the received information packets exceeds the data transfer rate of the read-out information packets. This process is termed RED=Random Early Discard, or also RIO=RED with In and Out. Received information packets can also be removed instead of the temporarily stored ones. The removed information packets are not transmitted to the destination address and are irretrievably lost. The process is used for so-called load balancing, that is to say a controlled throughput in relation to traffic volume, in order to prevent blocking, in particular. In order to facilitate RED, a knowledge of the occupancy levels of the stacking areas is necessary. The occupancy levels of the stacking areas are monitored by means of one or more separate detection units. Scanning, in particular, of the stacking areas at short time intervals is necessary to achieve this. The detected occupancy levels are transmitted to the RED processing units, which arrange removal of information packets if an occupancy level exceeds a predetermined threshold value.

SUMMARY OF THE INVENTION

The object of the invention is to create a router which facilitates a simplified load balancing.

This object is achieved by a router containing at least one buffer memory for the intermediate storage of pointers for information packets in at least two different buffer memory areas, a readout unit for reading out the different buffer memory areas one after the other in predetermined time windows, as well as at least one RED processing unit for removing pointers from buffer memory areas, wherein a feedback is provided from the readout unit to at least one RED processing unit in order to transmit at least one parameter to the at least one RED processing unit.

According to the invention, an indirect information signal concerning the occupancy levels of the stacking areas is passed to at least one RED processing unit via the feedback. Separate detection units are neither present nor necessary. Advantageously, the readout unit operates with the weighted round robin mechanism and the at least one RED processing unit transmits about the buffer memory locations processed in the time slots. In an advantageous manner, the router according to the invention takes into account individual data flows and/or service classes.

Advantageous developments are revealed in the dependent claims and in the following description.

BRIEF DESCRIPTION OF THE DRAWINGS

The invention is explained below by means of an exemplifying embodiment and with the aid of three figures, of which.

BEST MODE FOR CARRYING OUT THE INVENTION

Figure 1:
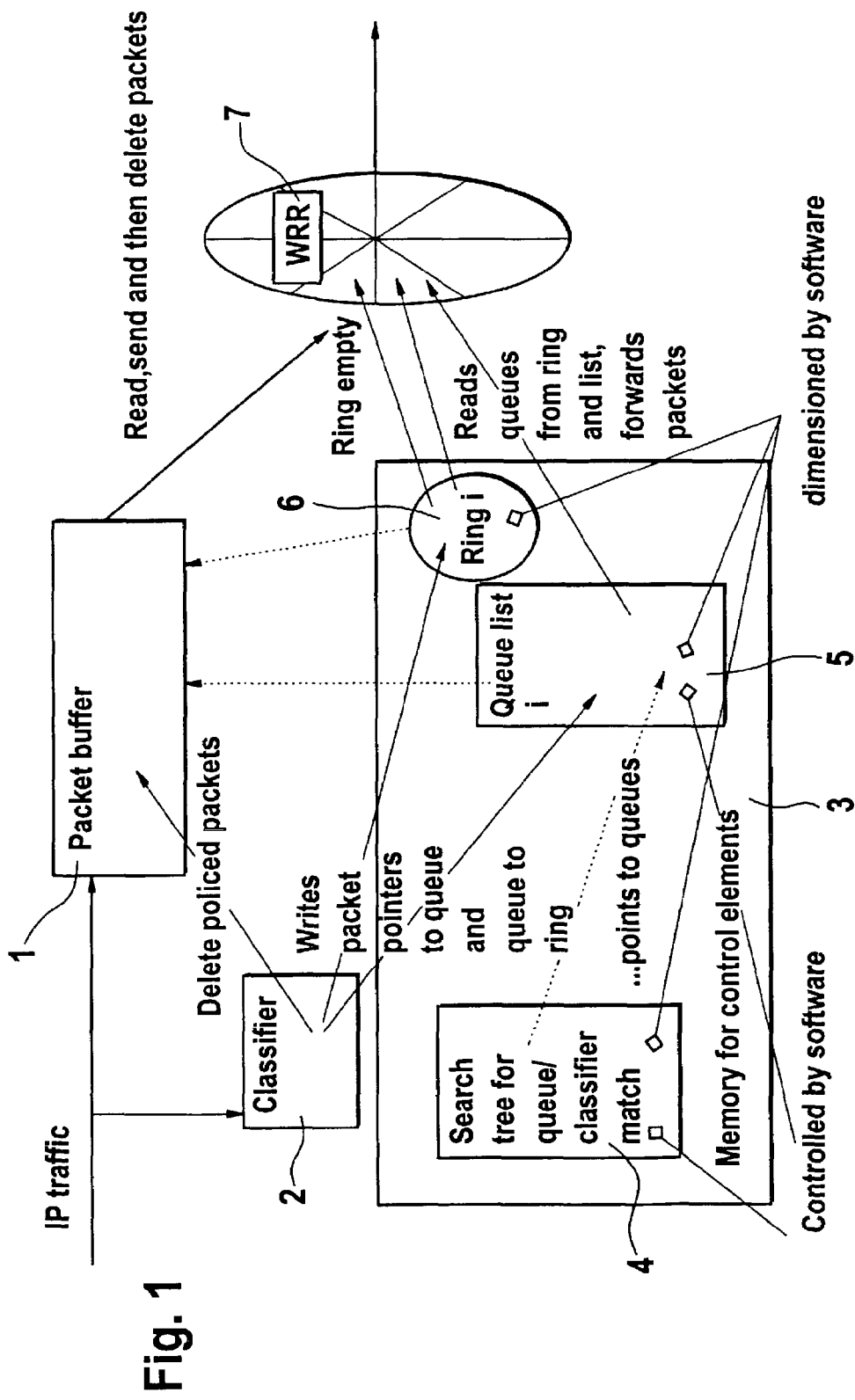
FIG. 1 shows a schematic representation of a router according to the invention.

The router in FIG. 1 contains a classifier 2, a buffer memory, a packet memory 1 and a readout unit 7, and is used for routing of received information packets.

The received information packets are temporarily stored in the packet memory 1. The information packets are Internet protocol packets, for example. Voice, data or video, for example, can be transmitted in them.

The pointers for the information packets, that are assigned on receipt of the information packets are temporarily stored in the buffer memory 3. The buffer memory can consist, for example, of a memory with several memory areas or several memories, each with one or more memory areas.

The classifier 2 is provided to evaluate the information packets from the received packet stream and to assign and evaluate individual data flows and to feed the corresponding pointers to the buffer memory area 5 or 6 according to the data flow demand.

On access via the classifier 2, the pointers for information packets, which are stored in the buffer memory 3 are arranged as required. If an overflow is imminent in a buffer memory area, for example, then individual pointers are selected and removed from the buffer memory area. The selected pointers are shifted into an additional buffer memory area, for example. This additional buffer memory area is then preferentially read out, so that the selected pointers are read out before the pointers in the buffer memory area. The criterion for the selection of a pointer is, for example, an expired reactivation time or a buffer memory area that is filled above a threshold value.

The readout unit 7 is used to read out the temporarily stored pointers and, by means of the read-out pointers, to detect and read out the information packets assigned to the read-out pointers. A so-called weighted round robin (WRR) mechanism is employed for the readout procedure. In the course of this, different buffer memory areas are read out one after the other and in predetermined time windows. A conventional weighted fair queuing (WFQ) assigns a certain bandwidth to each data type. The invention additionally handles individual data streams. An extended weighted fair queueing is thus realised by means of the invention.

Buffer memory 3 contains a buffer memory area 4 for a search tree, a buffer memory area 5 for storing pointers for information packets and a further buffer memory area 6 for storing selected pointers for information packets.

Figure 2:
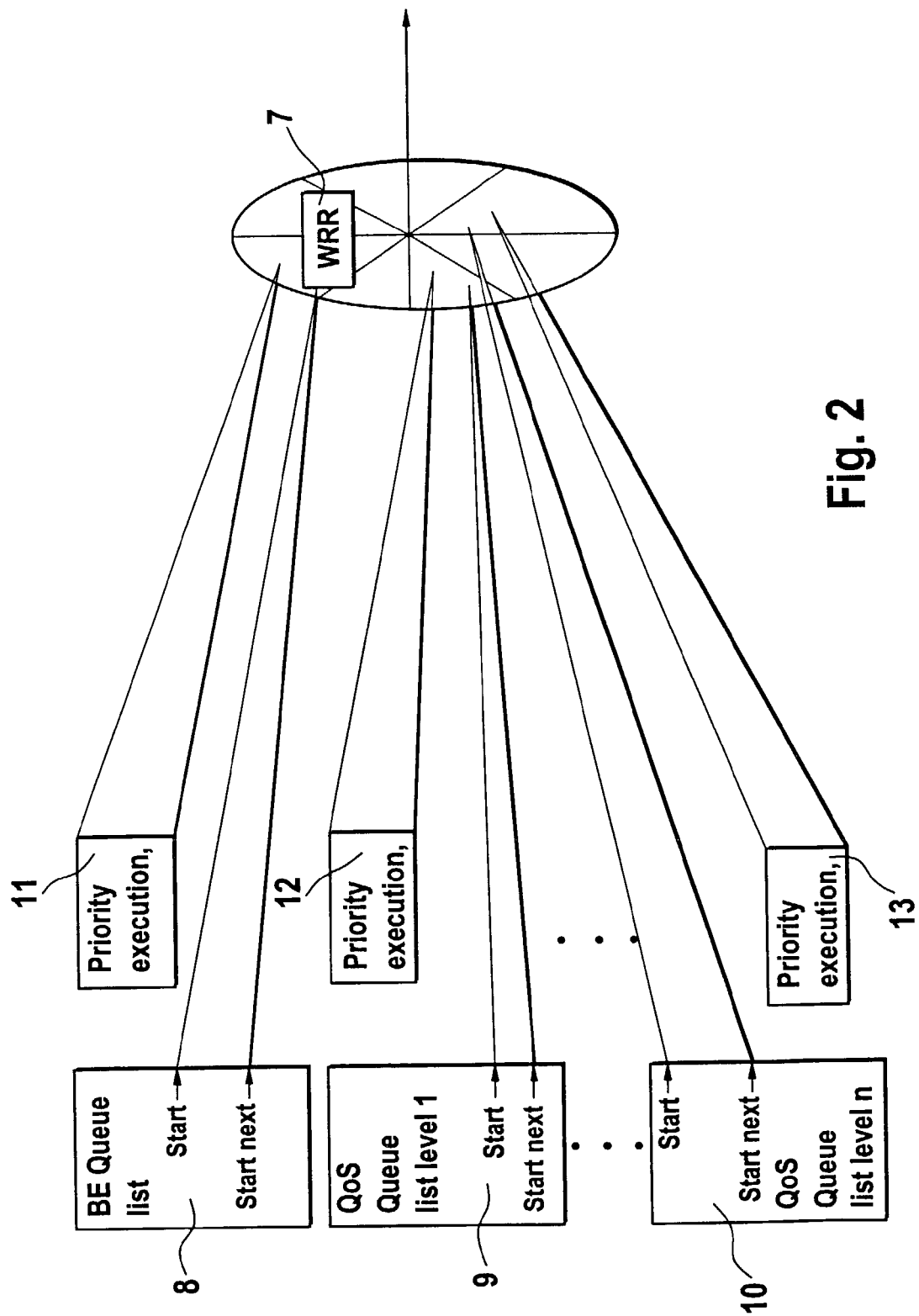
FIG. 2 shows a section of the router in FIG. 1.

Buffer memory area 5 contains buffer memory areas 8, 9, 10, that are shown in FIG. 2 and are used for storing pointers for information packets having different quality of service classes.

The other buffer memory area 6 contains buffer memory areas 11, 12, 13, that are shown in FIG. 2 and are used for storing selected pointers for information packets having different quality of service classes. Buffer memory area 11 is assigned to buffer memory area 8, buffer memory area 12 to buffer memory area 9, buffer memory area 13 to buffer memory area 10.

The buffer memory areas 4, 5, 6, 8, 9, 10, 11, 12, 13 of the buffer memory can be controlled and dimensioned by means of software.

Classifier 2 writes the pointers that are detected and assigned according to quality of service classes into the corresponding buffer memory areas 8, 9 10. Each pointer is stored, for example, along with a reactivation time.

If a buffer memory area 8, 9, 10 is filled above a specific threshold value, or if the reactivation time of a pointer stored in a buffer memory area 8, 9, 10, has expired, one or more pointers are shifted into the assigned further buffer memory area 11, 12, 13, for example pointers from buffer area 8 into further buffer memory area 11.

The readout unit 7 has direct access to the buffer memory areas 8, 9, 10 and the further buffer memory areas 11, 12, 13. The later are dealt with first. Each of the further buffer memory areas 11, 12, 13 has a smaller memory location capacity than the assigned buffer memory areas 8, 9, 10.

Buffer memory area 8 and further buffer memory area 11 form a group. Buffer memory area 9 and further buffer memory area 12 form a further group. Buffer memory area 10 and further buffer memory area 13 form a further group. The readout unit 7 has access to a group for a predetermined time period. The further buffer memory area 11, for example, is read out first of all. The predetermined time period is set so that all pointers stored in the further buffer memory area 11 are read out and the associated data packets can continue to be sent. Each of the further buffer memory areas 11, 12, 13 can be constructed as ring memories and enable processing priorities to be graded. In the remaining time period the readout unit 7 accesses buffer memory area 8 in order to handle further data flows which do not have enhanced priority. In the case of high load, even with VoIP only a part of the buffer memory areas 9, 10 is processed. But the buffer memory areas 12, 13 are always completely processed in the associated time slots in order to process individual packets which already have a high latency.

With the aid of each individual pointer the readout unit again determines the associated packet and arranges its transmission.

The time period for accessing a group can be equal to or different from the time period for accessing another group.

Two or more readout units, which have access to different groups, can be used instead of one readout unit 7. Readout unit 7 can be realised in hardware and/or software. Classifier 2 can be realised in hardware and/or software.

The router can be part of a so-called interactive network adapter and can, for example, be used in conjunction with the conversion of IP or ATM protocols into DOCSIS, DVB, HFC, MAC or HFR protocols, for example.

A search list in the form of a tree structure is stored in buffer memory area 4. This search list is used to carry out a match between data elements of the packet in the packet buffer 1 and classification element.

A comparator disposed in the classifier 2 compares the classification element of a header of a received information packet, that is to say, for example, an IP header, with the entries in the tree list. Each comparison discloses whether the classification element is smaller than, larger than or the same as the element of the tree list. The search list is structured in the form of a tree with three branches at each node. The result of each comparison is used for an address operation. If the corresponding address of the buffer memory area is located, the corresponding pointer is stored in the buffer memory area at the located address. Optionally, a second search list with a second tree structure is stored in the buffer memory area 4. Only one of the two tree structures is used at the same time. The unused tree structure can be adapted, reorganised, restructured, etc., in the meantime. In this way, a current and optimised tree structure is always used by the comparator.

Instead of a search list, another structure can also be used in the buffer memory area 4. In place of a direct comparison of data fields, a so-called "hashing" function can also be employed to optimise the comparison process. The use of a comparator is also optional.

Figure 3:
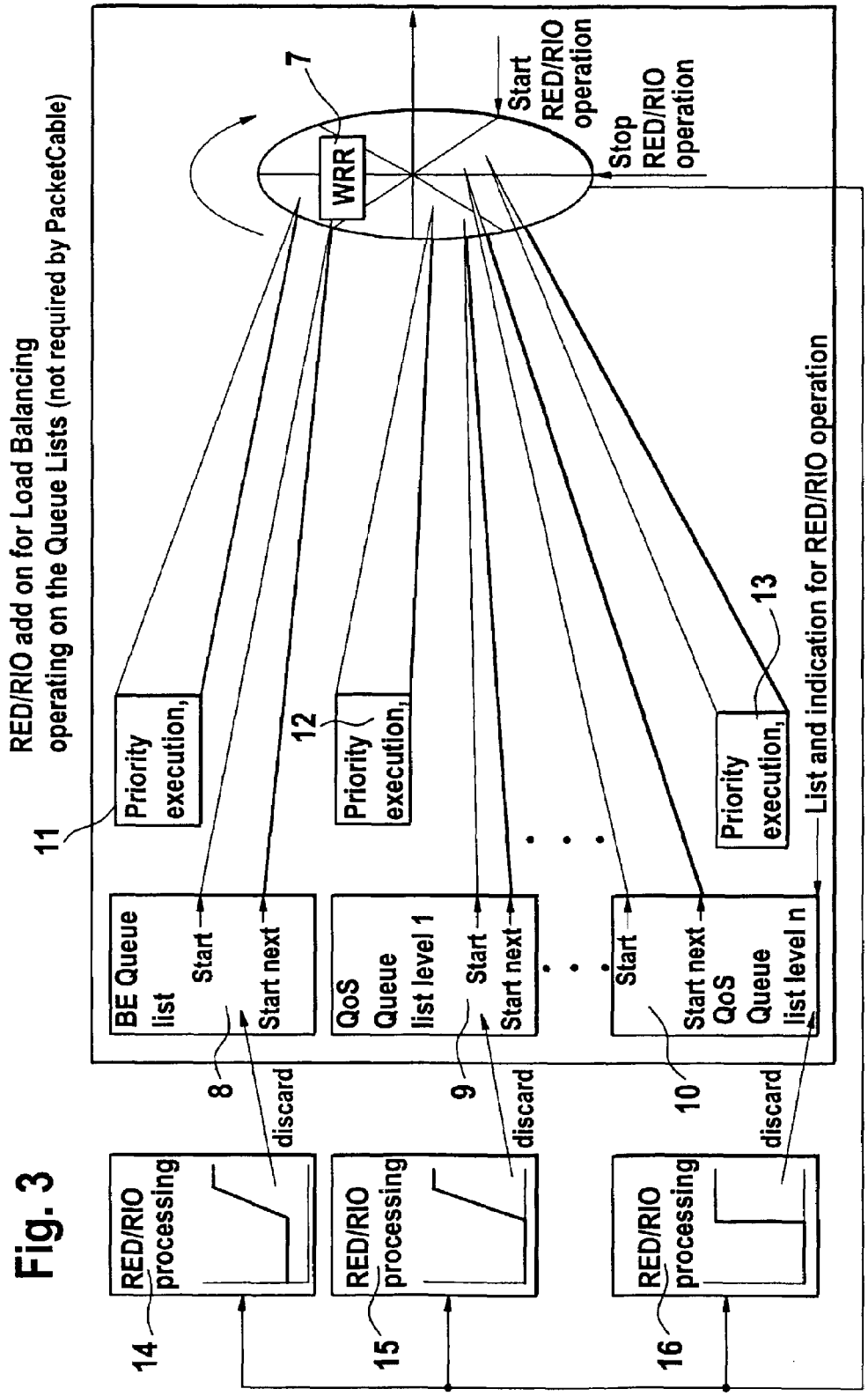
FIG. 3 shows a further section of the router in FIG. 1.

FIG. 3 shows a further section of the router of FIG. 1.

In addition to the buffer memory areas 8, 9, 10, the further buffer memory areas 11, 12, 13 and the readout unit 7, at least one RED processing unit 14, 15, 16 is provided.

A feedback loop is provided from the readout unit 7 to the at least one RED processing unit 14, 15, 16, to control the activation and the de-activation of the at least one RED processing unit 14, 15, 16.

The readout unit 7 operates with the weighted round robin mechanism and transmits information to the at least one RED processing unit 14, 15, 16 via the buffer memory locations processed in the time slots.

Instead of the at least one RED processing unit, at least one RIO processing unit is provided.

In a preferred development, the router is in particular characterised in that n buffer memory areas and n RED processing units 14, 15, 16 are provided, that n is a natural number, wherein n is, for example, a number between 2 and 100, that a RED processing unit 14, 15, 16 is assigned to each buffer memory area, and that for each RED processing unit 14, 15, 16, a feedback loop is provided in each case from the readout unit 7 to the corresponding RED processing unit 14, 15, 16.

The feedback can be implemented as a hardware solution or a software solution, for example. In the case of a hardware solution, registers are used, for example, to buffer parameters. In a software solution, a command with two parameters is used for a function call and the return values, for example: flow type and number of the processed flows, for example:

"ExecuteRIO(ActualQosClass, NumberOfServed Flows)". The flow type characterises the special buffer memory area and the processed flows the portion of the processed buffer memory locations in a time slot. Buffer memory locations can also be buffer memory segments. The readout unit 7 processes a specific number of buffer memory locations in a time slot assigned to a buffer memory area 8, 9, 10. Depending on the occupancy level of the buffer memory area 8, 9, 10, a more or less larger portion of the buffer memory locations is processed. The WRR can be organised in different ways, for example in one case the number of pointers and thus packets is absolutely constant at full load, or in another case constant over the average time. The portion of processed buffer memory locations can correspond to the ratio of the number of pointers read out or the number of stored pointers remaining in the buffer memory area on expiry of the time slot. In each time slot the readout unit processes the corresponding buffer memory area from a start address to an end address. The start address is specified by the end address of the preceding time slot assigned to the corresponding buffer memory area. The end address is the address at the end of the time slot after processing of the buffer memory locations. The number of processed buffer memory locations is thus known to the readout unit 7 from the difference between start and destination address. This information is made available to the corresponding RED processing unit, which can determine the load with the aid of the total sum of all intermediate storage operation of a service class. For example, ten buffer memory locations are processed in the time slot assigned to the buffer memory area 8. The information about the ten processed buffer memory locations is fed to the RED processing unit 14. After this the RED processing unit 14 decides by means of this information whether, and if yes, how many pointers are removed from the buffer memory area 8. The number of pointers to be removed can be zero, five or ten, for example. The number of pointers to be removed is, on the one hand, dependent on the number of processed buffer memory locations and, on the other hand, on the steepness of the decision curve of the RED processing unit 14.

Different RED processing units 14, 15, 16 having different decision curves can be used, for example for use by different services. For example, a RED processing unit 14 is used with a flat decision curve and a starting value other than zero for a best effort service for buffer memory area 8, a RED processing unit 15 with a flat decision curve with the starting value zero is used for a QoS service with variable data transmission rate for buffer memory area 9, and a RED processing unit 16 with a steep decision curve is used for a VoIP service with constant data transmission rate for buffer memory area 10.

There is a relationship between the load (=traffic load, utilisation) of a buffer memory area, the portion of processed buffer memory locations and the occupancy level of the buffer memory area. By transmitting the processed buffer memory locations, the readout unit 7 and thus the RED processing units 14, 15, 16 are triggered by indirectly using the corresponding occupancy levels of the buffer memory areas 8, 9, 10 as parameters.

The use of the further buffer memory areas 11, 12, 13 is optional. The invention can be employed both in embodiments with and without the further buffer memory areas 11, 12, 13.

The invention claimed is:

1. A router comprising:
   at least one buffer memory for intermediate storage of pointers for information packets in at least two different buffer memory areas,
   a readout unit for reading out the at least two different buffer memory areas one after the other in predetermined time windows, and
   at least one random early discard processing unit for removing pointers from the buffer memory areas,
   wherein a feedback is provided from the readout unit to the at least one random early discard processing unit, in order to transmit at least one parameter to the at least one random early discard processing unit, and
   the readout unit is equipped with a weighted round robin mechanism and the at least one random early discard processing unit transmits information about a number of buffer memory locations processed in the predetermined time windows, and
   the at least one random early discard processing unit contains means for deciding, with the aid of the information about the number of buffer memory locations processed in the predetermined time windows, whether pointers are removed from the at least two different buffer memory areas, and if it is decided that pointers are removed from the at least two different buffer memory areas, determining how many pointers are removed, wherein a number of pointers to be removed depends on the number of processed buffer memory locations and on a slope of a decision curve of the random early discard processing unit.

2. The router according to claim 1, wherein a classifier is provided in order to extract the pointers of the information packets from a received packet stream, to evaluate and to feed said pointers to the at least one buffer memory.

3. The router according to claim 1, wherein each of the at least two different buffer memory areas is used for the intermediate storage of pointers for information packets that belong to a special quality of service class.

4. The router according to claim 1, comprising n buffer memory areas and n random early discard processing units are provided,
   wherein n is a natural number,
   one of the at least one random early discard processing units is assigned to each buffer memory area, and for each of the at least one random early discard processing unit, a feedback loop is provided in each case from the readout unit to a corresponding random early discard processing unit.

5. The router according to claim 1, wherein at least one further buffer memory area is provided in order to store selected pointers, and during the reading out of the at least one buffer memory, the at least one further buffer memory area, is a preferred readout area compared to the at least two different buffer memory areas.

* * * * *